E. HOWELL.
GRUBBER.
No. 178,527.      Patented June 13, 1876.
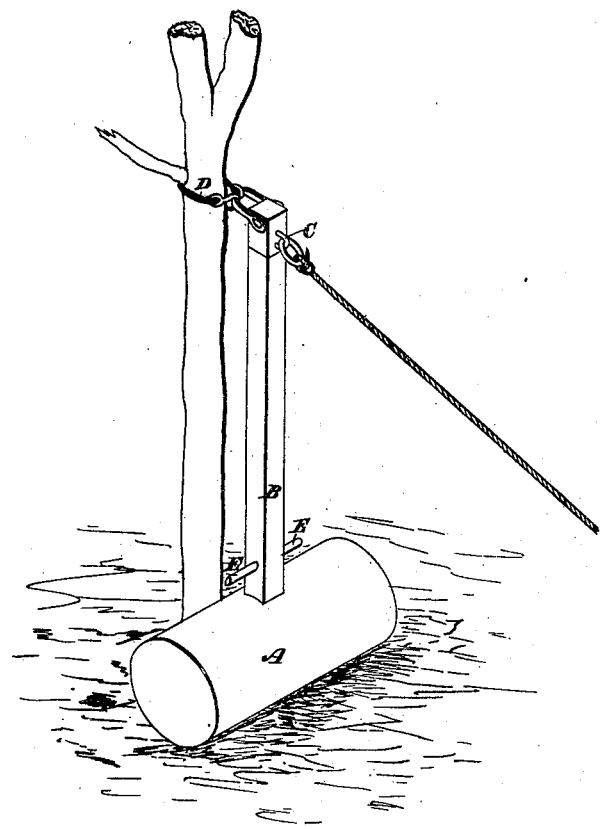
WITNESSES
Wm A. Hinkle
F. Stith
INVENTOR
Evan Howell
By his Attorney
Marcus S. Hopkins

UNITED STATES PATENT OFFICE.

EVAN HOWELL, OF WEST CARLISLE, OHIO.

IMPROVEMENT IN GRUBBERS.

Specification forming part of Letters Patent No. 178,527, dated June 13, 1876; application filed May 4, 1876.

*To all whom it may concern:*

Be it known that I, EVAN HOWELL, of West Carlisle, Coshocton county, Ohio, have invented a new and useful Improvement in Grubbers, of which the following is a specification, that will enable those skilled in the art to make and use the same, reference being had to the accompanying drawings, making part of this specification.

My improvement relates to that class of grubbers in which a perpendicular lever is used, having its fulcrum at the base of the tree to be grubbed or uprooted.

My design is to make a simple and effective grubber, such as ordinary farmers, with the means which they usually have upon their farms, will be enabled to construct and use.

My invention consists in a particular combination, hereinafter set forth and claimed.

In the accompanying drawings, A is a roller or base, which, in practice, should be about two feet long and one foot in diameter. B is a lever, perpendicular to the said roller, and secured to it, at about its center, by mortise and tenon, or otherwise. At the top of this lever, when in position for grubbing, is a staple, C, for the attachment of the draft-chain, and on the opposite side of the lever is a short chain, D, to be fastened around the tree to be grubbed. E E are handles for carrying the grubber from tree to tree.

The operation of my grubber is as follows: The roller is to be set, by means of the handles upon the lever, at the base of a tree, so that the lever shall stand in perpendicular position alongside the trunk. The short chain D at the top of the lever is then to be fastened around the tree, and the draft is to be applied by means of the draft-chain. The result is that the tree will be bent over the roller and uprooted.

I am aware that grubbers of this class, in general outline, are not new; but

What I claim as my improvement is—

The combination of the roller A, the lever B, the staple C, the chain D, and the handles E E, substantially as and for the purpose specified.

In testimony whereof I have hereunto subscribed my name.

EVAN HOWELL.

Witnesses:
  DANIEL MIKESELL,
  ANNA MIKESELL.